United States Patent
Sundman et al.

(10) Patent No.: US 12,376,154 B2
(45) Date of Patent: Jul. 29, 2025

(54) BACKOFF COUNTER HANDLING FOR TXOP SHARING

(71) Applicant: Telefonaktiebolaget LM Ericsson (publ), Stockholm (SE)

(72) Inventors: Dennis Sundman, Sollentuna (SE); Charlie Pettersson, Solna (SE); Miguel Lopez, Solna (SE); Guido Roland Hiertz, Aachen (DE); Leif Wilhelmsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 391 days.

(21) Appl. No.: 17/921,735

(22) PCT Filed: May 5, 2021

(86) PCT No.: PCT/EP2021/061850
§ 371 (c)(1),
(2) Date: Oct. 27, 2022

(87) PCT Pub. No.: WO2021/224326
PCT Pub. Date: Nov. 11, 2021

(65) Prior Publication Data
US 2023/0171806 A1 Jun. 1, 2023

Related U.S. Application Data

(60) Provisional application No. 63/020,204, filed on May 5, 2020.

(51) Int. Cl.
*H04W 16/14* (2009.01)
*H04W 74/0816* (2024.01)
(52) U.S. Cl.
CPC ........ *H04W 74/0816* (2013.01); *H04W 16/14* (2013.01)

(58) Field of Classification Search
CPC ..... H04W 74/0816; H04L 12/50; H04L 12/28
(Continued)

(56) References Cited

U.S. PATENT DOCUMENTS

2016/0157218 A1* 6/2016 Nam .................... H04B 7/0632
370/329
2017/0048880 A1* 2/2017 Anderson ............. H04W 72/54
(Continued)

OTHER PUBLICATIONS

IEEE Computer Society, "Part 11: Wireless LAN Medium Access Control (MAC) and Physical Layer (PHY) Specifications", IEEE Standard for Information technology—Telecommunications and information exchange between systems Local and metropolitan area networks—Specific requirements, IEEE Std 802.11-2016 (revision of IEEE Std 802.11-2012), Dec. 7, 2016, pp. 1-3534, IEEE.
(Continued)

*Primary Examiner* — Dang T Ton
(74) *Attorney, Agent, or Firm* — COATS & BENNETT, PLLC (57) ABSTRACT

An access point of a wireless communication system configures a carrier for communication with one or more wireless devices associated with the access point. Based on a backoff counter maintained by the access point, the access point contends for access to the carrier to transmit data. In response to another access point winning contention for access to the carrier, the access point cooperates at least with the access point winning the contention by sharing a transmission opportunity reserved on the carriers by the access point winning the contention and transmitting at least a part of the data in the shared transmission opportunity. During the shared transmission opportunity the access point pauses the backoff counter.

20 Claims, 9 Drawing Sheets

(58) Field of Classification Search
USPC .................................. 370/329, 400, 401, 403
See application file for complete search history.

(56) References Cited

U.S. PATENT DOCUMENTS

| | | |
|---|---|---|
| 2020/0045723 A1 | 2/2020 | Chun et al. |
| 2020/0077273 A1 | 3/2020 | Cherian et al. |
| 2020/0106579 A1 | 4/2020 | Cherian et al. |

OTHER PUBLICATIONS

Naribole, S. et al., "Shared TXOP protocol", Mar. 15, 2020, pp. 1-17, IEEE 802.11-20/0277r0, IEEE.
Park, S. et al., "Coordinated Spatial Reuse Procedure", Mar. 16, 2020, pp. 1-20, IEEE 802.11-20/0410r0, IEEE.
Guo, J. et al., "Coordinated Spatial Reuse Operation", Dec. 31, 2019, pp. 1-13, IEEE 802.11-20/0033r0, IEEE.
Verma, L. et al., "Corrdinated AP Time/Frequency Sharing in a Transmit Opportunity in 11be", Jan. 1, 2020, pp. 1-15, IEEE 802.11-19/1582r2, IEEE.

* cited by examiner

BACKOFF COUNTER HANDLING FOR TXOP SHARING

TECHNICAL FIELD

The present invention relates to methods for controlling wireless transmissions and to corresponding devices, systems, and computer programs.

BACKGROUND

In wireless communication technologies, there is an increased interest in using unlicensed bands, like the 2.4 GHz ISM (industrial, scientific, and medical) band, the 5 GHz band, the 6 GHz band, and the 60 GHz band using more advanced channel access technologies. Historically, Wi-Fi has been the dominant standard in unlicensed bands when it comes to applications requiring support for high data rates. Due to the large available bandwidth and effectively no competing technology in the unlicensed band, the WLAN (Wireless Local Area Network) technology based on the IEEE 802.11 family standards provides a very simple distributed channel access mechanism based on the so-called distributed coordination function (DCF).

Distributed channel access means that a device, in IEEE 802.11 terminology known as a station (STA), tries to access the channel when it has something to send. Effectively there is no difference in channel access whether the station is an access point or a non-access point. DCF works well as long as the load is not too high. When the load is high, and in particular when the number of stations trying to access the channel is large, channel access based on DCF does not work well. The reason for this is that there will be a high probability of collision on the channel, leading to poor channel usage.

To improve the channel usage, and in particular to allow for better support of a large number of devices, a more centralized channel access may be utilized, similar to channel access schemes utilized in cellular networks. Such centralized channel access may involve that rather than letting a station access the channel whenever it has data to send, the channel access is controlled by the AP (access point). A corresponding channel access scheme is for example supported in the IEEE 802.11ax technology, see IEEE P802.11ax™/D6.0 Draft Standard for Information technology—Tele-communications and information exchange between systems Local and metropolitan area networks—Specific requirements Part 11: Wireless LAN Medium Access Control (MAC) and Physical Layer (PHY) Specifications Amendment 1: Enhancements for High Efficiency WLAN (November 2019), in the following denoted as "IEEE 802.11ax Draft".

The IEEE 802.11ax technology for example supports orthogonal frequency division multiple access (OFDMA) in both downlink (DL), i.e., in a direction from the AP to the station, and uplink (UL), i.e., in a direction from the station to the AP. Also multi-user transmission in form of multi-user multiple input multiple output (MU-MIMO) is supported for both the DL and the UL. By supporting MU transmission and letting the AP control the channel access, efficient channel usage is achieved and one can avoid collisions due to contention within a cell, in the IEEE 802.11 terminology also referred to as basic service set (BSS).

A default channel access mechanism used in current WLAN systems is referred to as enhanced distributed channel access (EDCA), as specified in IEEE Standard for Information technology—Telecommunications and information exchange between systems Local and metropolitan area networks—Specific requirements—Part 11: Wireless LAN Medium Access Control (MAC) and Physical Layer (PHY) Specifications," in IEEE Std 802.11-2016 (Revision of IEEE Std 802.11-2012), vol., no., pp. 1-3534, 14 Dec. 2016, in the following denoted as "IEEE 802.11 PHY Specifications". In the EDCA channel access mechanism, the STA accesses the channel using a set of channel access parameters based on a traffic class of the data. The channel is obtained for a TXOP duration time, in which multiple frames of the same data class may be transmitted. The maximum size of a TXOP depends on the data type. A typical duration of a TXOP is in the range of a few milliseconds.

To improve the performance even further, coordination of channel usage between cells may be utilized. Here, one approach is to let a number of APs share a TXOP (transmission opportunity). For example, if there are two or more APs within range using the same channel, with no coordination each of them would contend for the channel and the AP that wins the contention would then reserve the channel using the TXOP concept. The other APs would have to defer from channel access and wait for the TXOP to end. Then a new contention begins and channel access may or may not be gained for a specific AP. This implies that channel access becomes rather unpredictable and support for demanding QoS (Quality of Service) applications may be challenging. Such issues may be avoided by coordinated sharing of the TXOP by multiple APs. Such features are also referred to as cooperating APs (CAP).

Figure 1:
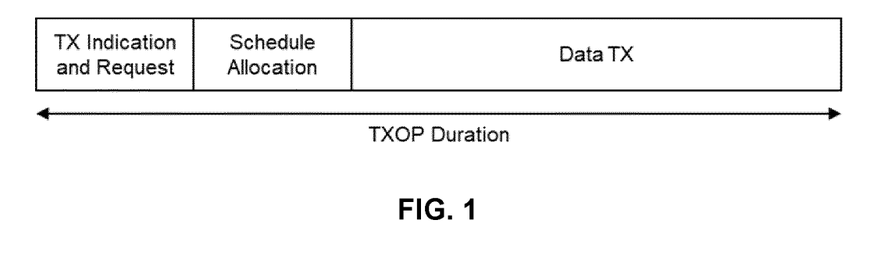
FIG. 1 schematically illustrates phases of an example of a procedure for sharing of a TXOP by multiple APs.

For example, "Coordinated AP Time/Frequency Sharing in a Transmit Opportunity in 11be", Internet document IEEE 802.11-19/1582r1 (URL: "https://mentor.ieee.org/802.11/dcn/19/11-19-1582-01-00be-coordinated-ap-time-and-frequency-sharing-in-a-transmit-opportunity-in-11be.pptx", November 2019) or "Shared TXOP protocol", Internet document IEEE 802.11-20/0277r0 (URL: https://mentor.ieee.org/802.11/dcn/20/11-20-0277-00-00be-coordinated-ofdma-protocol.pptx, March 2020) propose a time/frequency resource sharing mechanism for an enhancement of the WLAN technology referred to as EHT (Extremely High Throughput). In this mechanism multiple APs belonging to the same Extended Service Set (ESS) can coordinate and share among themselves their time/frequency resources within a TXOP. As schematically illustrated in FIG. 1, the mechanism utilizes three phases: A first phase, a second phase, and a third phase. The first phase involves transmission of a TX indication frame and a request frame. In the first phase an AP that has gained a TXOP, also denoted as the TXOP owner, indicates to other APs that it is willing to share the TXOP (by means of the TX indication frame), and one or more neighboring APs indicate their intention to participate in sharing the resources (by the request frame). The first phase may also be referred to as initial coordination phase. In the second phase the TXOP owner informs the participating APs about their allocated resources and a TX start time, and the participating APs inform their client STAs about their respective resource allocations. In the third phase the participating APs transmit on their respective allocated resources in the TXOP, beginning at the TX start time.

Figure 2:
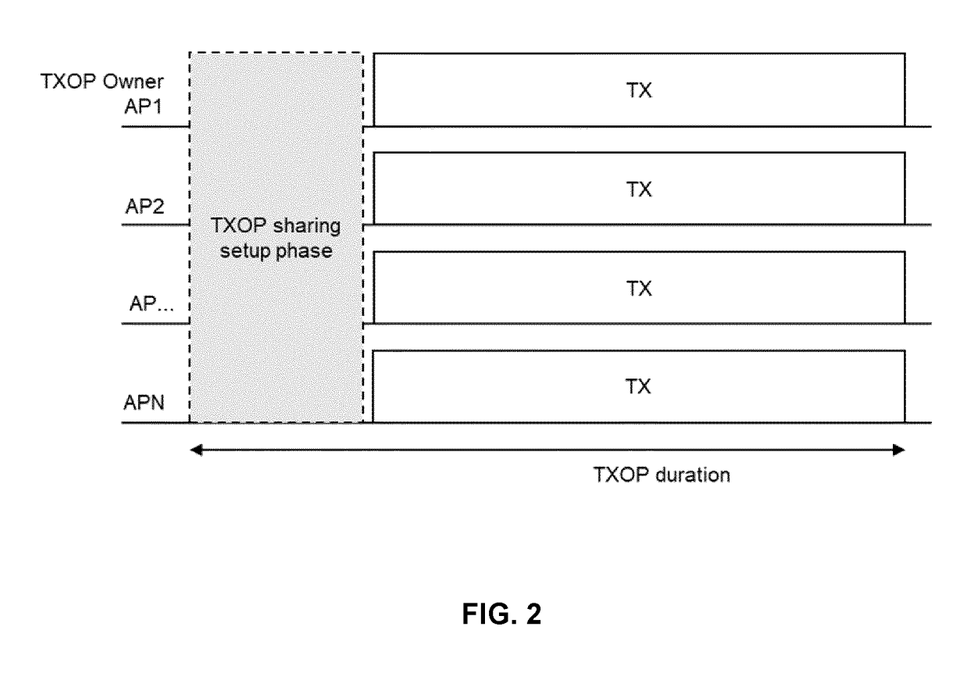
FIG. 2 shows an example for further illustrating sharing of the TXOP.

FIG. 2 further illustrates the sharing of a TXOP. The example of FIG. 2 involves multiple APs, denoted as AP1, AP2, . . . , APN. For the sake of a better overview, stations associated with the APs are omitted from the illustration of FIG. 2. AP1 is assumed to be the TXOP owner, and the other APs are participating in sharing of the TXOP. As can be seen, after an initial TXOP sharing setup phase, e.g., as explained in connection with FIG. 1, the APs cooperate by sharing the TXOP for transmissions. The sharing of the TXOP can be based on multiplexing in the time domain, multiplexing in the frequency domain, or multiplexing in the spatial domain. Further, the sharing can be based on spatial reuse, i.e., rather than multiplexing the resources of the TXOP, the resources can be used simultaneously, sometimes in combination with transmit power control, e.g., as described in "Coordinated Spatial Reuse Operation", Internet document IEEE 802.11-20/0033r0 (URL: https://mentor.ieee.org/802.11/dcn/20/11-20-0033-00-00be-coordinated-spatial-reuse-operation.pptx, December 2019) or in "Coordinated Spatial Reuse Procedure", Internet document IEEE 802.11-20/0410r0 (URL: https://mentor.ieee.org/802.11/dcn/20/11-20-0410-00-00be-coordinated-spatial-reuse-procedure.pptx, March 2020).

From Section 10.3.3 of the IEEE 802.11 PHY Specifications, it can be seen that to contend for the medium, a STA shall select a backoff (BO) counter as an integer number uniformly chosen between [0, CW]. The contention window (CW) is reset to aCWmin after each successful transmission. When a transmission fails, the CW shall be doubled until it reaches aCWmax, at which remains until the CW is reset.

A reverse direction protocol, as described in Section 10.28 of the IEEE 802.11 PHY Specifications can be used for a TXOP holder (called RD initiator) to hand over the TXOP holdership to a STA (called RD responder). Here, it should be noted that the RD responder may transmit data to the RD initiator without performing a channel access on its own (see in particular Section 10.28.4 of the IEEE 802.11 PHY Specifications).

However, the existing behavior concerning the handling of the BO counter may provide unsatisfactory results in connection with TXOP sharing, because for an AP not winning contention for the medium but then participating in the sharing of a TXOP reserved by another AP may be treated in the same way as an AP without any possibility to transmit. This may result a lack of fairness and a lack of efficiency of the contention process.

Accordingly, there is a need for techniques which allow for improved sharing of a TXOP, e.g., with respect to efficiency and fairness when contending for access to the carrier.

SUMMARY

According to an embodiment, a method of controlling wireless transmissions in a wireless communication system is provided. According to the method, an access point (AP) of the wireless communication system configures a carrier for communication with one or more wireless devices (WDs) associated with the access point. Based on a backoff (BO) counter maintained by the AP, the AP contends for access to the carrier to transmit data. In response to another AP winning contention for access to the carrier, the AP cooperates at least with the AP winning the contention by sharing a transmission opportunity (TXOP) reserved on the carriers by the AP winning the contention and transmitting at least a part of the data in the shared TXOP. During the shared TXOP the AP pauses the BO counter.

According to a further embodiment, an AP for a wireless communication system is provided. The AP is configured to configure a carrier for communication with one or more WDs associated with the AP. Further, the AP is configured to, based on a BO counter maintained by the AP, contend for access to the carrier to transmit data. Further, the AP is configured to, in response to another AP winning contention for access to the carrier, cooperate least with the AP winning the contention by sharing a TXOP reserved on the carrier by the AP winning the contention and transmitting at least a part of the data in the shared TXOP. Further, the AP is configured to pause the BO counter during the shared TXOP.

According to a further embodiment, an AP for a wireless communication system is provided. The AP comprises at least one processor and a memory. The memory contains instructions executable by said at least one processor, whereby the AP is operative to configure a carrier for communication with one or more WDs associated with the AP. Further, the memory contains instructions executable by said at least one processor, whereby the AP is operative to, based on a BO counter maintained by the AP, contend for access to the carrier to transmit data. Further, the memory contains instructions executable by said at least one processor, whereby the AP is operative to, in response to another AP winning contention for access to the carrier, cooperate least with the AP winning the contention by sharing a TXOP reserved on the carrier by the AP winning the contention and transmitting at least a part of the data in the shared TXOP. Further, the memory contains instructions executable by said at least one processor, whereby the AP is operative to pause the BO counter during the shared TXOP.

According to a further embodiment, a system is provided. The system comprises multiple APs. Each of the APs is configured to: configure a carrier for communication with one or more WDs respectively associated with the AP, based on a BO counter maintained by the AP, contend for access to the carrier to transmit data, in response to another one of the APs winning contention for access to the carrier, cooperate least with the AP winning the contention by sharing a TXOP reserved on the carriers by the AP winning the contention and transmitting at least a part of the data in the shared TXP, and pause the BO counter during the shared TXOP. The system may further comprise at least one WDs configured to receive data transmitted in the shared TXOP.

According to a further embodiment of the invention, a computer program or computer program product is provided, e.g., in the form of a non-transitory storage medium, which comprises program code to be executed by at least one processor of an AP for a wireless communication system. Execution of the program code causes the AP to configure a carrier for communication with one or more WDs associated with the AP. Further, execution of the program code causes the AP to, based on a BO counter maintained by the AP, contend for access to the carrier to transmit data. Further, execution of the program code causes the AP to, in response to another AP winning contention for access to the carrier, cooperate least with the AP winning the contention by sharing a TXOP reserved on the carrier by the AP winning the contention and transmitting at least a part of the data in the shared TXOP. Further, execution of the program code causes the AP to pause the BO counter during the shared TXOP.

Details of such embodiments and further embodiments will be apparent from the following detailed description of embodiments.

DETAILED DESCRIPTION

In the following, concepts in accordance with exemplary embodiments of the invention will be explained in more detail and with reference to the accompanying drawings. The illustrated embodiments relate to controlling of wireless transmissions in a wireless communication system. The wireless communication system may be a WLAN (Wireless Local Area Network) system based on a IEEE 802.11 technology. However, it is noted that the illustrated concepts could also be applied to other wireless communication technologies, e.g., to contention-based modes of the LTE (Long Term Evolution) or NR (New Radio) technology specified by 3GPP ($3^{rd}$ Generation Partnership Project).

Figure 3:
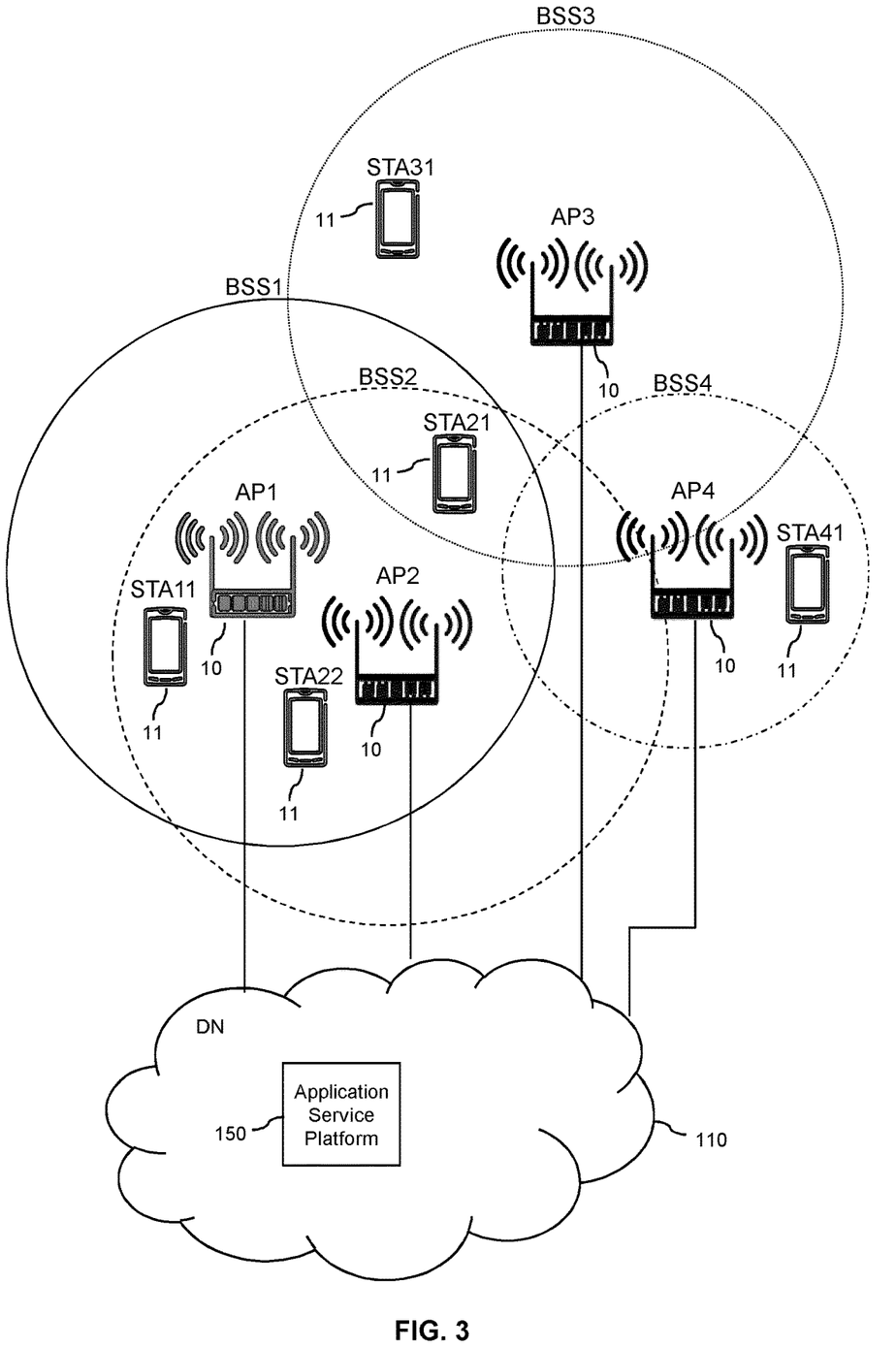
FIG. 3 schematically illustrates a wireless communication system according to an embodiment.

FIG. 3 illustrates an exemplary wireless communication system according to an embodiment. In the illustrated example, the wireless communication system includes multiple APs 10, in the illustrated example referred to as AP1, AP2, AP3, AP4, and multiple stations (STAs) 11, in the illustrated example referred to as STA11, STA21, STA22, STA31, and STA41. The station STA11 is served by AP1 (in a first BSS denoted as BSS1), the stations STA21 and STA22 are served by AP2 (in a second BSS denoted as BSS2). The station STA31 is served by AP3 (in a third BSS denoted as BSS3). The station STA41 is served by AP4 (in a third BSS denoted as BSS3). The stations 11 may correspond to various kinds of WDs (wireless devices), for example user terminals, such as mobile or stationary computing devices like smartphones, laptop computers, desktop computers, tablet computers, gaming devices, or the like. Further, the stations 11 could for example correspond to other kinds of equipment like smart home devices, printers, multimedia devices, data storage devices, or the like.

In the example of FIG. 3, each of the stations 11 may connect through a radio link to one of the APs 10. For example, depending on location or channel conditions experienced by a given station 11, the station 11 may select an appropriate AP 10 and BSS for establishing the radio link. The radio link may be based on one or more OFDM carriers from a frequency spectrum which is shared on the basis of a contention based mechanism, e.g., an unlicensed band like the 2.4 GHz ISM band, the 5 GHz band, the 6 GHz band, or the 60 GHz band.

Each AP 10 may provide data connectivity of the stations 11 connected to the AP 10. As further illustrated, the APs 10 may be connected to a data network (DN) 110. In this way, the APs 10 may also provide data connectivity of stations 11 connected to different APs 10. Further, the APs 10 may also provide data connectivity of the stations 11 to other entities, e.g., to one or more servers, service providers, data sources, data sinks, user terminals, or the like. Accordingly, the radio link established between a given station 11 and its serving AP 10 may be used for providing various kinds of services to the station 11, e.g., a voice service, a multimedia service, or other data service. Such services may be based on applications which are executed on the station 11 and/or on a device linked to the station 11. By way of example, FIG. 3 illustrates an application service platform 150 provided in the DN 110. The application(s) executed on the station 11 and/or on one or more other devices linked to the station 11 may use the radio link for data communication with one or more other stations 11 and/or the application service platform 150, thereby enabling utilization of the corresponding service(s) at the station 11.

To achieve high performance in a scenario like illustrated in FIG. 3, coordination between the cells or BSSs may be utilized. In the illustrated examples, the involved APs 10 are assumed to contend for and share common resources. In particular, two or more of the APs 10 may contend for the same wireless medium or radio channel in order to obtain a TXOP. Then, the winning AP 10 can share the resources with the other contending APs in a dynamic fashion. For example, it can share the resources differently in different TXOPs. The wireless medium or radio channel may be based on one or more carriers, e.g., OFDM carriers. Accordingly, in the present disclosure the term carrier may correspond to or be equivalent to a wireless medium or a radio channel.

The illustrated concepts are based on using a contention mechanism in which a BO counter is used for controlling access attempts by the APs and associated WDs. In particular, the BO counter may be started in response to an unsuccessful access attempt, and a next access attempt allowed only after expiry of the BO counter. The starting value of the BO counter may be may be based on a contention window. For example, each AP and each WD may maintain a BO counter. The BO counter may be set to an integer number chosen between [0, CW], with CW denoting the size of the contention window. The choice of the integer number may be based on a uniform random distribution. After each successful access attempt, the BO counter may be reset. CW may then be reset to a minimum value aCWmin. When an access attempt fails, CW may be increased. For example, CW may be doubled until it reaches a maximum value aCWmax, and then remain at the maximum value aCWmax until CW is reset. The control of the BO counter and the size of the contention window may for example be based on principles as defined in the IEEE 802.11 PHY Specifications. As further explained below, specific rules may be applied in situations where an AP participates in sharing of a TXOP.

Figure 4A:
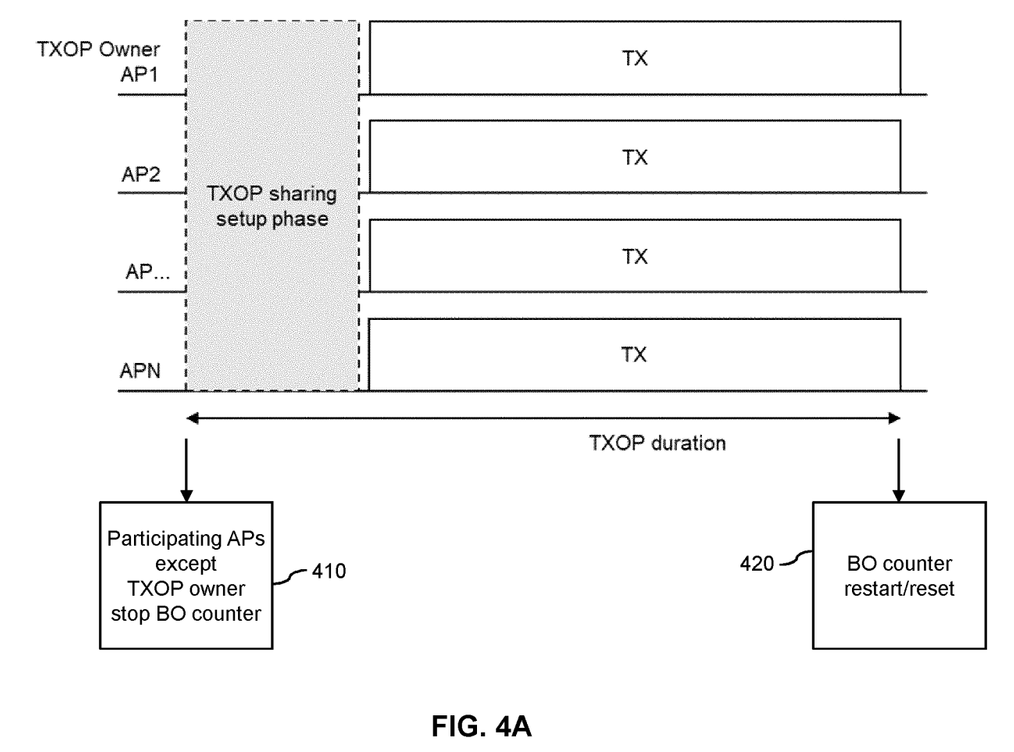
FIGS. 4A and 4B schematically illustrate an example of a procedure for sharing of a TXOP with control of a backoff counter according to an embodiment.
Figure 4B:
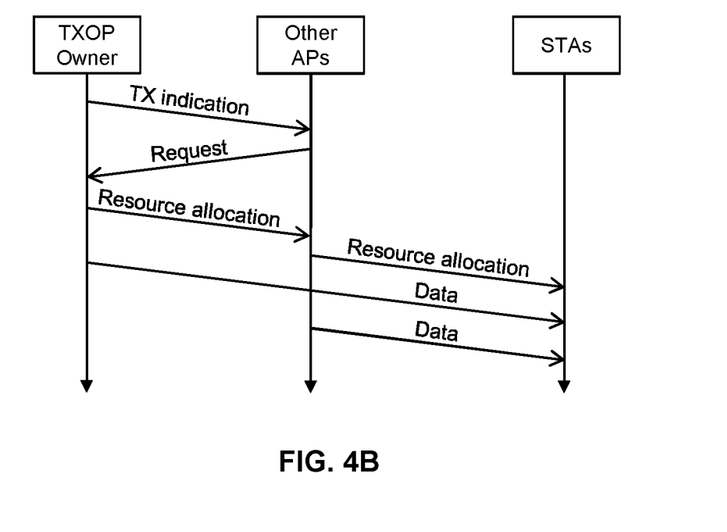

FIGS. 4A and 4B schematically illustrate a scenario which involves sharing of a TXOP according to an embodiment. The example of FIGS. 4A and 4B involves multiple APs, denoted as AP1, AP2, . . . , APN. For the sake of a better overview, stations associated with the APs are omitted from the illustration of FIG. 4A. AP1 is assumed to be the TXOP owner, and the other APs are participating in sharing of the TXOP. As can be seen, after an initial TXOP sharing setup phase, the APs cooperate by sharing the TXOP for transmissions. The sharing of the TXOP can be based on multiplexing in the time domain, multiplexing in the frequency domain, or multiplexing in the spatial domain. Further, the sharing can be based on spatial reuse, i.e., rather than multiplexing the resources of the TXOP, the resources can be used simultaneously, sometimes in combination with transmit power control.

The TXOP sharing setup phase may involve that an AP that has gained a TXOP, i.e., the TXOP owner, indicates to other APs that it is willing to share the TXOP. This may be accomplished by sending an invitation message, also referred to as "TX indication frame". The other APs may then indicate their intention to participate in sharing the TXOP. This may involve sending a request message to the TXOP owner, also referred to as "request frame". In a next part of the TXOP sharing setup phase, the TXOP owner may inform the other participating APs about their allocated resources and a transmit (TX) start time, and the participating APs may inform their respective associated WDs about their respective resource allocations. This may in each case be accomplished by sending "scheduling information". In a next phase the participating APs may transmit on their respective allocated resources in the TXOP, beginning at the TX start time. FIG. 4B schematically illustrates a corresponding signaling procedure between the TXOP owner, other APs, and STAs associated with the TXOP owner and the other APs.

As illustrated by block 410 of FIG. 4A, the APs participating in the sharing of the TXOP, except the TXOP owner, pause their respective BO counter during the sharing of the TXOP. For example, these APs may pause their BO counter upon sending the request message to the TXOP owner or upon receiving the invitation message from the TXOP owner. As illustrated by block 420 of FIG. 4A, the APs continue their BO respective counter after the sharing of the TXOP. This may involve continuing the BO counter from its paused value. In some situations, if an AP successfully transmitted all pending data in its TX buffer, this may also involve resetting the BO counter. The TXOP owner may behave in a conventional manner, e.g., by resetting its BO counter when successfully gaining access to the carrier. Resetting the BO counter may involve resetting the size of the contention window to its minimum value.

Figure 5:
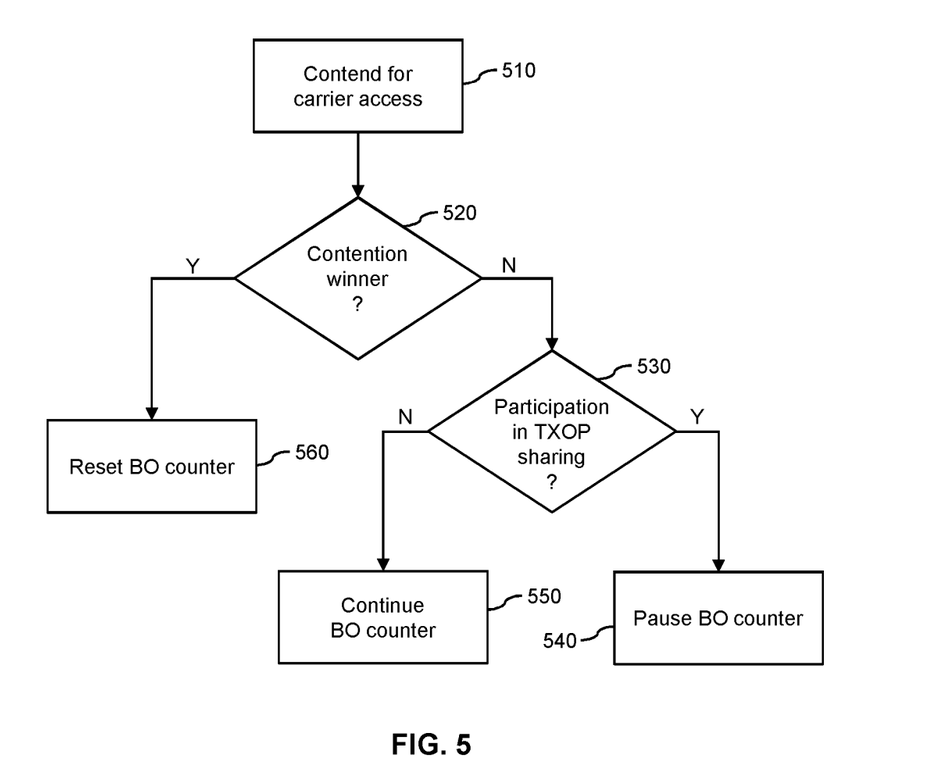
FIG. 5 shows an example of processes for controlling the backoff counter according to an embodiment.

FIG. 5 schematically illustrates processes performed by an AP for controlling the BO counter at the beginning of a TXOP sharing phase.

At block 510, the AP contends for carrier access. The contention process is based on a BO counter maintained by the AP. As explained above, the contention process may involve increasing the size of a contention window upon each unsuccessful carrier access attempt by the AP.

At block 520, the AP determines if it has won access to the carrier, i.e., if it is the contention winner. If this is not the case, as indicated by branch "N", the AP goes to a BO state and the processes continue with block 530, where the AP checks if it is participating in sharing of a TXOP on the carrier, which was reserved by another AP. If this is the case, as indicated by branch "Y", the processes continue with block 540, where the AP pauses the BO counter at its current value.

If the check of block 530 yields that the AP is not participating in sharing of a TXOP on the carrier, the processes continue with block 550, where the AP continues the BO counter. This may specifically involve that the AP decreases the BO counter, with a next carrier access attempt being allowed only after expiry of the BO counter.

If the check of block 520 yields that the AP is the contention winner, the processes continue with block 560, where the AP resets the BO counter in response to the carrier access attempt of block 510 being successful. Here, resetting the BO counter may involve that the AP randomly selects a new starting value for the BO counter from the contention window. In addition, the resetting of the BO counter may involve that, before selecting the new starting value of the BO counter, the AP resets the size of the contention window to its minimum value, such as the above-mentioned aCWmin.

Figure 6:
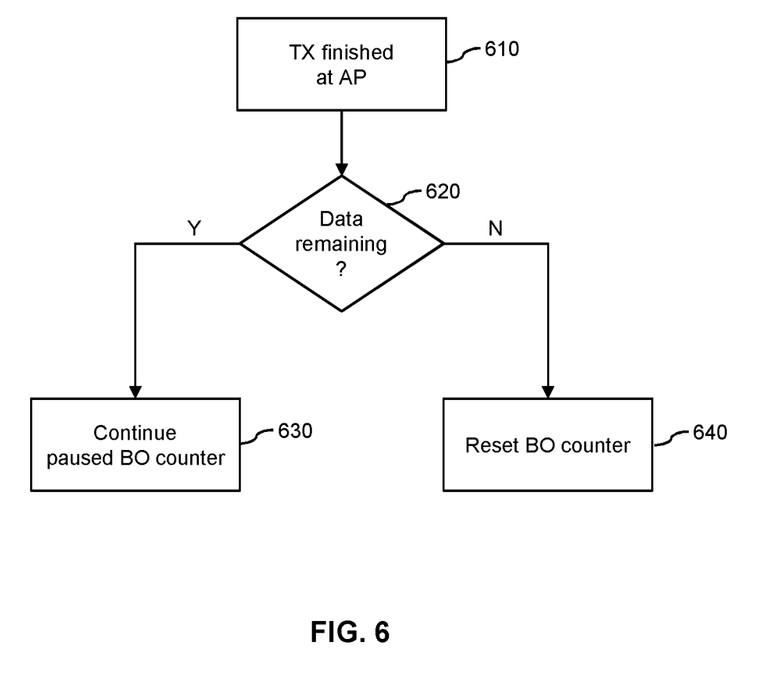
FIG. 6 shows a further example of processes for controlling the backoff counter according to an embodiment.

FIG. 6 schematically illustrates processes performed by an AP participating in sharing of a TXOP for controlling the BO counter at the end of a TXOP sharing phase. The processes of FIG. 6 may be performed after pausing the BO counter at block 540 of FIG. 5 and starting the transmission of data in the shared TXOP.

At block 610, the transmission of data in the shared TXOP is finished at the AP.

At block 620, the AP checks if data pending for transmission remain at the AP. For example, the AP may check the status of a transmit buffer of the AP and, if the transmit buffer is found to be empty, determine that there are no remaining data pending for transmission. If there are remaining data pending for transmission, the processes continue with block 630, as indicated by branch "Y". At block 630, the AP continues the BO counter.

If there are no remaining data pending for transmission, the processes continue with block 640, as indicated by branch "N". At block 640, the AP resets the BO counter. This may involve that the AP randomly selects a new starting value for the BO counter from the contention window. In addition, this may involve that, before selecting the new starting value of the BO counter, the AP resets the size of the contention window to its minimum value, such as the above-mentioned aCWmin.

Figure 7:
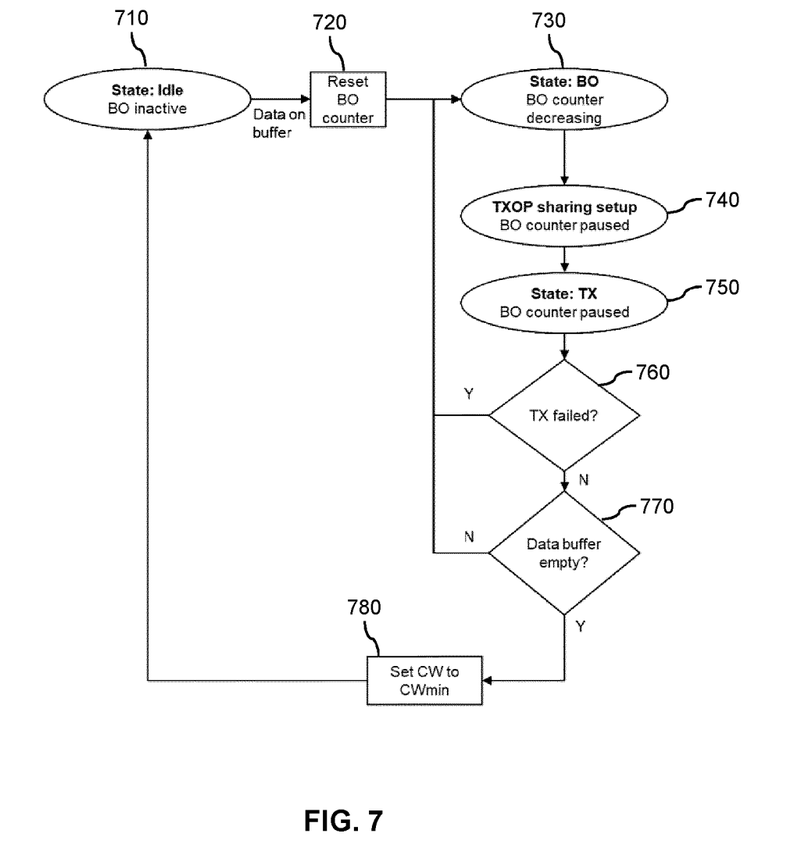
FIG. 7 shows an state diagram for schematically illustrating control of a backoff counter according to an embodiment.

FIG. 7 shows a state diagram for further illustrating a TXOP sharing procedure according to an embodiment.

At 710, the AP is idle, with the BO mechanism being inactive. Upon arrival of data in the transmit buffer of the AP, the AP performs an access attempt and, in response to the access attempt being unsuccessful, resets and starts the BO counter, as illustrated by block 720, and goes to a BO state, indicated at 730. In the BO state, the BO counter is continuously decreasing with time. A further access attempt of the AP would only be allowed upon expiry of the BO counter.

The AP then decides to participate in sharing of a TXOP reserved by another AP. As indicated at 740, the AP pauses its BO counter in the TXOP sharing setup procedure, e.g., in response to sending the request message to the TXOP owner. As indicated at 750, the BO counter remains paused during transmission in the shared TXOP.

At the end of the shared TXOP, the AP checks if the transmission of the data failed, as indicated at 760. For example, the AP may check if it received an acknowledgement (ACK) for the data transmitted in the shared TXOP: If at least a part of the transmission of the data failed, the AP continues the BO counter and returns to the BO state 730, as indicated by branch "Y". If the transmission of the data did not fail, the AP checks if the transmit data buffer of the AP is empty, i.e., if the AP successfully transmitted all data pending for transmission, as indicated at 770. If this is not the case, the AP continues the BO counter and returns to the BO state 730, as indicated by branch "N". If the transmit buffer is found to be empty, i.e., if the AP successfully transmitted all data pending for transmission, the AP resets the BO counter and sets the contention window to its minimum size, such as the above-mentioned aCWmin, as indicated at 780. The AP may then return to the idle state, i.e., to state 710.

Figure 8:
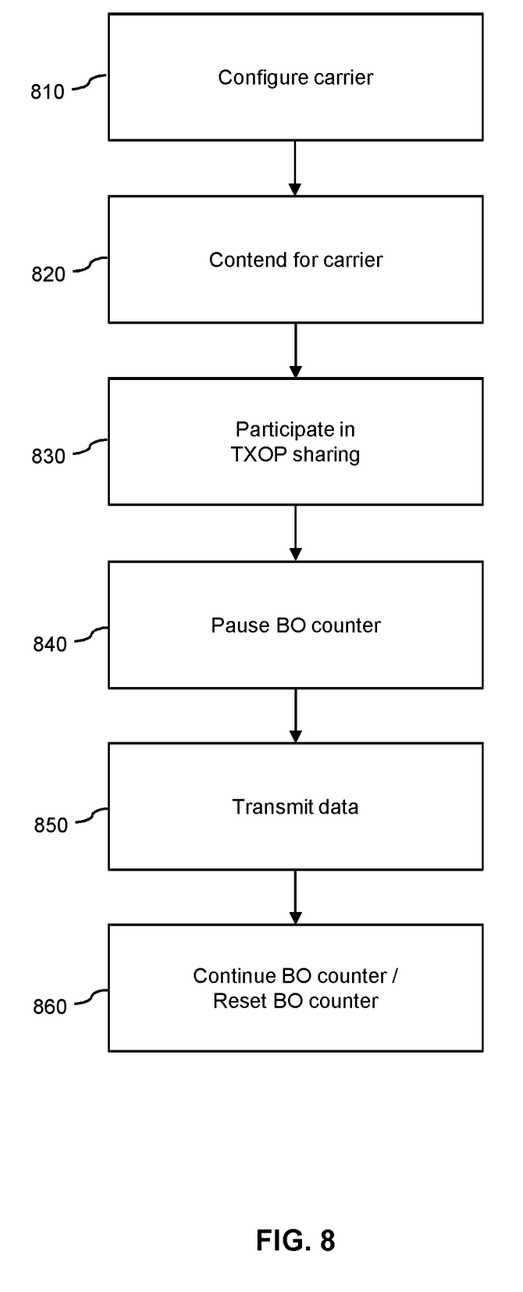
FIG. 8 shows a flowchart for schematically illustrating a method according to an embodiment.

FIG. 8 shows a flowchart for illustrating a method, which may be utilized for implementing the illustrated concepts. The method of FIG. 8 may be used for implementing the illustrated concepts in a network node, in particular an AP for a wireless communication system. The wireless communication system may be based on a wireless local area network, WLAN, technology, e.g., according to the IEEE 802.11 standards family. The AP may for example correspond to any of the above-mentioned APs 10.

If a processor-based implementation of the AP is used, at least some of the steps of the method of FIG. 8 may be performed and/or controlled by one or more processors of the AP. Such AP may also include a memory storing program code for implementing at least some of the below described functionalities or steps of the method of FIG. 8.

At step 810, the AP configures a carrier for communication with one or more WDs associated with the AP. The one or more WDs may for example correspond to the above-mentioned wireless devices 11. The one or more wireless devices may be stations in a BSS served by the AP.

At step 820, the access point contends for access to the carrier. This may involve performing a CCA or LBT procedure to assess whether the carrier is occupied. The process of contending for the carrier is based on a BO counter. The BO counter may be used to control when the AP may perform a next attempt to gain access to the carrier, by allowing the next attempt in response to expiry of the BO counter. A starting value of the BO counter may be randomly set from a contention window. The size of the contention window may be controlled to increase with each unsuccessful access attempt. In some scenarios, the AP may reset the BO counter in response to the AP winning the contention for access to the carrier. In other scenarios, another AP may win the contention for access to the carrier. In such cases, the other AP may reserve a TXOP on the carrier and allow other APs to share the TXOP.

At step 830, the AP cooperates at least with the other AP winning the contention, but optionally also with one or more further AP, by sharing the TXOP. The sharing of the TXOP may be based on multiplexing of wireless transmissions on the carrier in the time domain, in the frequency domain, and/or in the spatial domain. In some scenarios, the sharing of the TXOP may also be based on spatial reuse.

The sharing of the TXOP may involve that the AP receives, from the AP winning the contention, an invitation to participate in the sharing of the TXOP. The sharing of the TXOP may then be coordinated based on the invitation. Further, the sharing of the TXOP may involve that the AP sends, to the AP winning the contention, a request to participate in the sharing of the TXOP. The sharing of the TXOP may then be coordinated based on the request. Further, the sharing of the TXOP may involve that the AP receives scheduling information from the AP winning the contention. The sharing of the TXOP may then be coordinated based on the scheduling information.

At step 840, the AP pauses the BO counter during the shared TXOP. Pausing the BO counter involves that the BO counter is brought into a paused state, in which the BO counter keeps its current value. The AP may pause the BO counter when setting up the sharing of the TXOP, e.g., in response to receiving the above-mentioned invitation, in response to sending the above-mentioned request, or in response to receiving the above-mentioned scheduling information.

At step 850, the AP transmits at least a part of the data in the shared TXOP. In particular, the AP may transmit data to one or more of its associated WDs. The transmission of the data may be based on multiplexing in the time domain, in the frequency domain, and/or in the spatial domain. In some scenarios, the transmission of the data may also be based on spatial reuse.

At step 860, the AP may continue the BO counter after the shared TXOP. Continuing the BO counter involves that the BO counter is restarted and continues counting from the value which was kept in the paused state. Based on the continued BO counter, the AP may then further contend for access to the carrier to transmit a further part of the data or transmit other data. Alternatively, the AP may reset the BO counter after the shared TXOP. For example, in response to the AP successfully transmitting the data in the shared TXOP, the may AP reset the BO counter. In some scenarios, the AP may store the data in a transmit buffer and reset the BO counter in response to the transmit buffer being empty after the shared TXOP. Resetting the BO counter may involve selecting a new starting value for the BO counter based on the current contention window. In some scenarios, resetting of the BO counter may also involve adjusting the size of the contention window, in particular resetting the size contention window to a minimum value, such as the above-mentioned aCWmin or otherwise reducing the size of the contention window.

Figure 9:
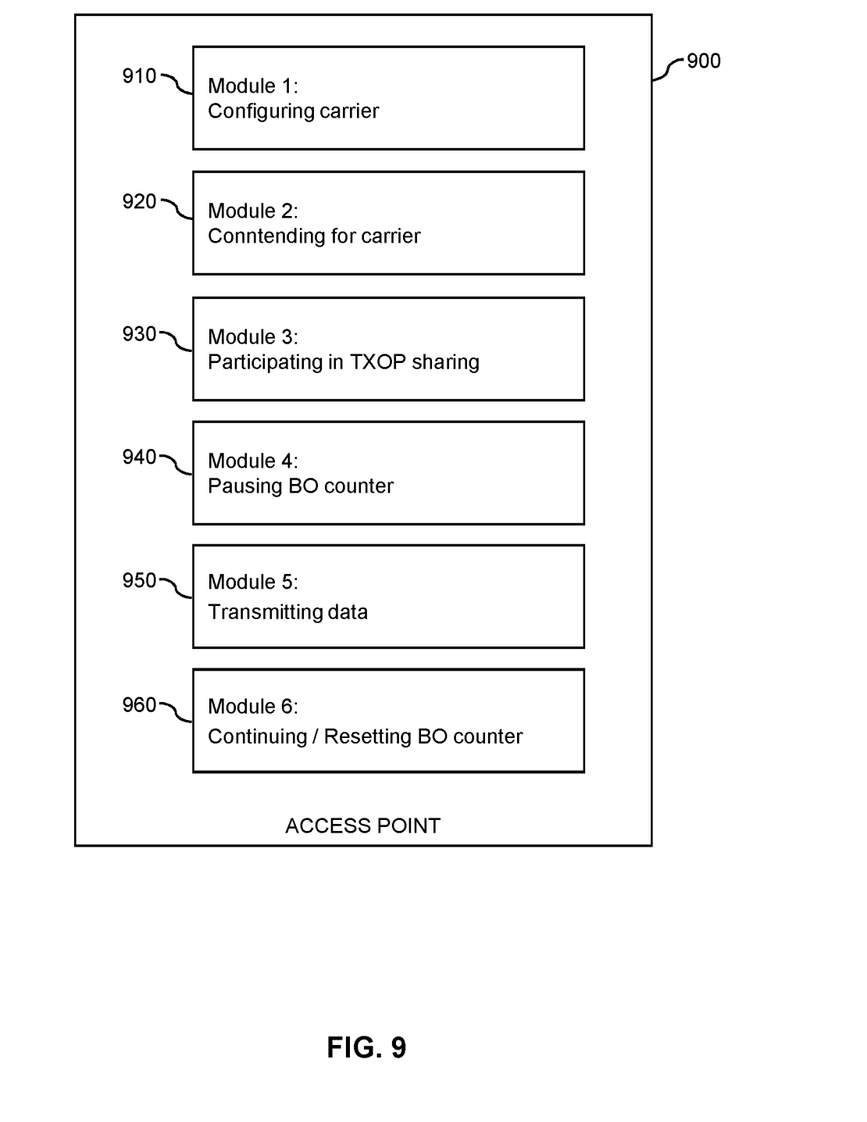
FIG. 9 shows a block diagram for schematically illustrating functionalities of an access point according to an embodiment.

FIG. 9 shows a block diagram for illustrating functionalities of an AP 900 which operates according to the method of FIG. 8. The AP 900 may for example correspond to one of above-mentioned APs 10. As illustrated, the AP 900 may be provided with a module 910 configured to configure a carrier for communication with one or more wireless devices, such as explained in connection with step 810. Further, the AP 900 may be provided with a module 920 configured to contend for the carrier based on a BO counter, such as explained in connection with step 820. Further, the AP 900 may be provided with a module 930 configured to cooperate with one or more other APs by sharing a TXOP, such as explained in connection with step 830. Further, the AP 900 may optionally be provided with a module 940 configured to pause the BO counter, such as explained in connection with step 840. Further, the AP 900 may be provided with a module 950 configured to transmit data in the shared TXOP, such as explained in connection with step 850. Further, the AP 900 may be provided with a module 960 configured to continue or reset the BO counter, such as explained in connection with step 860.

It is noted that the AP 900 may include further modules for implementing other functionalities, such as known functionalities of a WLAN AP. Further, it is noted that the modules of the AP 900 do not necessarily represent a hardware structure of the AP 900, but may also correspond to functional elements, e.g., implemented by hardware, software, or a combination thereof. It is noted that the functionalities as described in connection with FIGS. 8 and 9 could also be implemented in a system including multiple APs. In such system, each AP could operate according to the method of FIG. 8. Further, such system could include one or more wireless devices associated with the APs.

Figure 10:
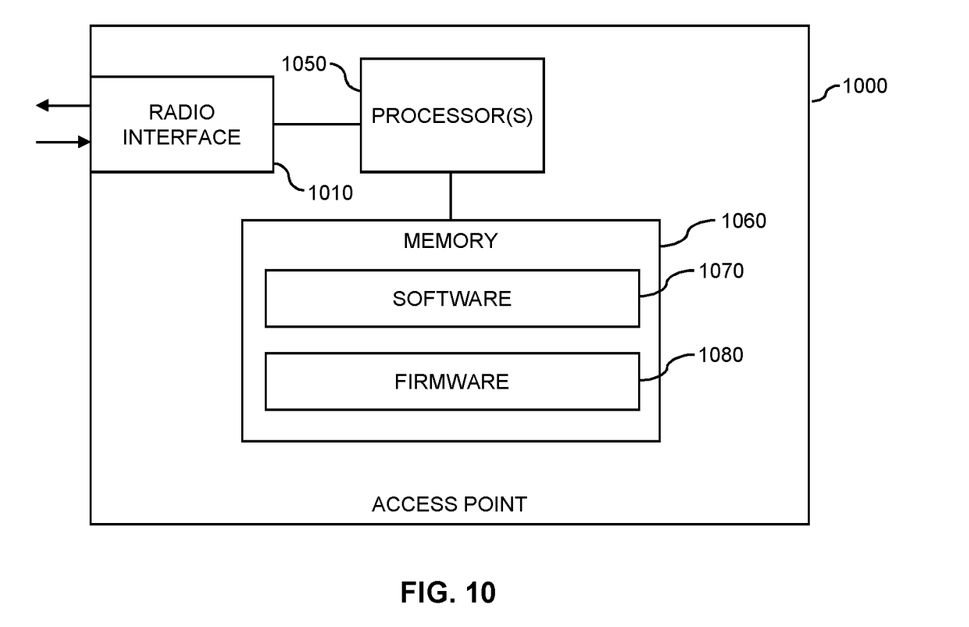
FIG. 10 schematically illustrates structures of an access point according to an embodiment.

FIG. 10 illustrates a processor-based implementation of an AP 1000 which may be used for implementing the above-described concepts. For example, the structures as illustrated in FIG. 10 may be used for implementing the concepts in any of the above-mentioned APs 10.

As illustrated, the AP 1000 includes one or more radio interfaces 1010. The radio interface(s) 1010 may for example be based on a WLAN technology, e.g., according to an IEEE 802.11 family standard. However, other wireless technologies could be supported as well, e.g., the LTE technology or the NR technology. In some scenarios, the radio interface(s) 1010 may be based on multiple antennas of the AP 1000 and support beamformed multi-antenna port transmission to enable spatial multiplexing of wireless transmissions.

Further, the AP 1000 may include one or more processors 1050 coupled to the radio interface(s) 1010 and a memory 1060 coupled to the processor(s) 1050. By way of example, the radio interface(s) 1010, the processor(s) 1050, and the memory 1060 could be coupled by one or more internal bus systems of the AP 1000. The memory 1060 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1060 may include software 1070 and/or firmware 1080. The memory 1060 may include suitably configured program code to be executed by the processor(s) 1050 so as to implement the above-described functionalities for controlling wireless transmissions, such as explained in connection with FIGS. 8 and 9.

It is to be understood that the structures as illustrated in FIG. 10 are merely schematic and that the AP 1000 may actually include further components which, for the sake of clarity, have not been illustrated, e.g., further interfaces or further processors. Also, it is to be understood that the memory 1060 may include further program code for implementing known functionalities of an AP. According to some embodiments, also a computer program may be provided for implementing functionalities of the AP 1000, e.g., in the form of a physical medium storing the program code and/or other data to be stored in the memory 1060 or by making the program code available for download or by streaming.

As can be seen, the concepts as described above may be used for efficiently controlling contention-based access to a carrier by APs participating in sharing of a TXOP. In particular, the concepts may allow for enabling high fairness, e.g., as measured in terms of channel utilization, and throughput in situations where TXOP sharing is used. The fairness and throughput may be comparable to situations where no TXOP sharing is used.

It is to be understood that the examples and embodiments as explained above are merely illustrative and susceptible to various modifications. For example, the illustrated concepts may be applied in connection with various kinds of wireless technologies, without limitation to WLAN technologies. Further, the concepts may be applied with respect to various types of APs and stations. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

In view of the above, embodiments provided in the present disclosure include:

Embodiment 1

A method of controlling wireless transmissions in a wireless communication system, the method comprising:
an access point (10; 900; 1000) of the wireless communication system configuring a carrier for communication with one or more wireless devices associated with the access point (10; 900; 1000);
based on a backoff counter maintained by the access point (10; 900; 1000), the access point (10; 900; 1000) contending for access to the carrier to transmit data;
in response to another access point (10; 900; 1000) winning contention for access to the carrier, the access point (10; 900; 1000) cooperating at least with the access point (10; 900; 1000) winning the contention by sharing a transmission opportunity reserved on the carrier by the access point (10; 900; 1000) winning the contention and transmitting at least a part of the data in the shared transmission opportunity; and
the access point (10; 900; 1000) pausing the backoff counter during the shared transmission opportunity.

Embodiment 2

The method according to embodiment 1, comprising:
after the shared transmission opportunity, the access point (10; 900; 1000) continuing the backoff counter.

Embodiment 3

The method according to embodiment 2, comprising:
based on the continued backoff counter, the access point (10; 900; 1000) further contending for access to the carrier to transmit a further part of the data.

Embodiment 4

The method according to embodiment 2 or 3, comprising:
based on the continued backoff counter, the access point (10; 900; 1000) further contending for access to the carrier to transmit other data.

Embodiment 5

The method according to any one of embodiments 1 to 4, comprising:
in response to the access point (10; 900; 1000) successfully transmitting the data in the shared transmission opportunity, the access point (10; 900; 1000) resetting the backoff counter.

Embodiment 6

The method according to any one of embodiments 1 to 5, comprising:
the access point (10; 900; 1000) storing the data in a transmit buffer; and
the access point (10; 900; 1000) resetting the backoff counter in response to the transmit buffer being empty after the shared transmission opportunity.

Embodiment 7

The method according to embodiment 5 or 6,
wherein resetting the backoff counter comprises randomly selecting a new starting value for the backoff counter from a contention window.

Embodiment 8

The method according to embodiment 7,
wherein resetting the backoff counter comprises adjusting a size of the contention window.

Embodiment 9

The method according to embodiment 8,
wherein resetting the backoff counter comprises setting the size of the contention window to a minimum value.

Embodiment 10

The method according to any one of embodiments 1 to 9, comprising:
the access point (10; 900; 1000) receiving, from the access point (10; 900; 1000) winning the contention, an invitation to participate in the sharing of the transmission opportunity,
wherein the sharing of the transmission opportunity is coordinated based on the invitation.

Embodiment 11

The method according to any one of embodiments 1 to 10, comprising:
the access point (10; 900; 1000) sending, to the access point (10; 900; 1000) winning the contention, a request to participate in the sharing of the transmission opportunity,
wherein the sharing of the transmission opportunity is coordinated based on the request.

Embodiment 12

The method according to any one of embodiments 1 to 11, comprising:
the access point (10; 900; 1000) receiving scheduling information from the access point (10; 900; 1000) winning the contention,
wherein the sharing of the transmission opportunity is coordinated based on the scheduling information.

Embodiment 13

The method according to any one of embodiments 1 to 12, comprising:
in response to the access point (10; 900; 1000) winning the contention for access to the carrier, the access point (10; 900; 1000) resetting the backoff counter.

Embodiment 14

The method according to any one of embodiments 1 to 13,
wherein the wireless communication system is based on a Wireless Local Area Network technology according to the IEEE 802.11 standards family.

Embodiment 15

An access point (10; 900; 1000) for a wireless communication system, the access point (10; 900; 1000) being configured to:
configure a carrier for communication with one or more wireless devices associated with the access point (10; 900; 1000);
based on a backoff counter maintained by the access point (10; 900; 1000), contend for access to the carrier to transmit data;
in response to another access point (10; 900; 1000) winning contention for access to the carrier, cooperate least with the access point (10; 900; 1000) winning the contention by sharing a transmission opportunity reserved on the carrier by the access point (10; 900; 1000) winning the contention and transmitting at least a part of the data in the shared transmission opportunity; and
pause the backoff counter during the shared transmission opportunity.

Embodiment 16

The access point (10; 900; 1000) according to embodiment 15,
wherein the access point (10; 900; 1000) is configured to perform a method according to any one of embodiments 1 to 14.

Embodiment 17

The access point (10; 900; 1000) according to embodiment 15 or 16, comprising:
at least one processor (1050), and
a memory (1060) containing program code executable by the at least one processor (1050),
whereby execution of the program code by the at least one processor (1050) causes the access point (10; 900; 1000) to perform a method according to any one of embodiments 1 to 11.

Embodiment 18

A system, comprising:
multiple access points (10; 900; 1000) each configured to:
configure a carrier for communication with one or more wireless devices respectively associated with the access point (10; 900; 1000);
based on a backoff counter maintained by the access point (10; 900; 1000), contend for access to the carrier to transmit data;
in response to another one of the access points (10; 900; 1000) winning contention for access to the carrier, cooperate least with the access point (10; 900; 1000) winning the contention by sharing a transmission opportunity reserved on the carrier by the access point (10; 900; 1000) winning the contention and transmitting at least a part of the data in the shared transmission opportunity; and
pause the backoff counter during the shared transmission opportunity.

Embodiment 19

The system according to embodiment 18, further comprising:
at least one wireless device (11) configured to receive data transmitted in the shared transmission opportunity.

Embodiment 20

A computer program or computer program product comprising program code to be executed by at least one processor (1050) of an access point (10; 900; 1000), whereby execution of the program code causes the access point (10; 900; 1000) to perform a method according to any one of embodiments 1 to 19.

The invention claimed is:

1. A method of controlling wireless transmissions in a wireless communication system, implemented by an access point of the wireless communication system, the method comprising:
   configuring a carrier for communication with one or more wireless devices associated with the access point;
   contending for access to the carrier, based on a backoff counter maintained by the access point, to transmit data;
   in response to another access point winning contention for access to the carrier, cooperating at least with the other access point by sharing a transmission opportunity reserved on the carrier by the other access point and transmitting at least a part of the data in the shared transmission opportunity; and
   pausing the backoff counter during the shared transmission opportunity.

2. The method of claim 1, further comprising continuing the backoff counter after the shared transmission opportunity.

3. The method of claim 2, further comprising contending further for access to the carrier, based on the continued backoff counter, to transmit a further part of the data and/or other data.

4. The method of claim 1, further comprising:
   storing the data in a transmit buffer; and
   resetting the backoff counter in response to the transmit buffer being empty after the shared transmission opportunity.

5. The method of claim 1, further comprising, in response to successfully transmitting the data in the shared transmission opportunity, resetting the backoff counter.

6. The method of claim 5, wherein resetting the backoff counter comprises randomly selecting a new starting value for the backoff counter from a contention window.

7. The method of claim 6, wherein resetting the backoff counter comprises setting the size of the contention window to a minimum value.

8. The method of claim 1, further comprising receiving, from the other access point, an invitation to participate in the sharing of the transmission opportunity, wherein the sharing of the transmission opportunity is coordinated based on the invitation.

9. The method of claim 1, further comprising sending, to the other access point, a request to participate in the sharing of the transmission opportunity, wherein the sharing of the transmission opportunity is coordinated based on the request.

10. The method of claim 1, further comprising receiving scheduling information from the other access point, wherein the sharing of the transmission opportunity is coordinated based on the scheduling information.

11. An access point comprising:
    processing circuitry; and
    a memory containing program code executable by the processing circuitry, whereby the access point is configured to:
      configure a carrier for communication with one or more wireless devices associated with the access point;
      contend for access to the carrier, based on a backoff counter maintained by the access point, to transmit data;
      in response to another access point winning contention for access to the carrier, cooperate at least with the other access point by sharing a transmission opportunity reserved on the carrier by the other access point and transmitting at least a part of the data in the shared transmission opportunity; and
      pause the backoff counter during the shared transmission opportunity.

12. The access point of claim 11, wherein the access point is further configured to continue the backoff counter after the shared transmission opportunity.

13. The access point of claim 12, wherein the access point is further configured to contend further for access to the carrier, based on the continued backoff counter, to transmit a further part of the data and/or other data.

14. The access point of claim 11, wherein the access point is further configured to:
    store the data in a transmit buffer; and
    reset the backoff counter in response to the transmit buffer being empty after the shared transmission opportunity.

15. The access point of claim 11, wherein the access point is further configured to, in response to successfully transmitting the data in the shared transmission opportunity, reset the backoff counter.

16. The access point of claim 15, wherein to reset the backoff counter, the access point is configured to randomly select a new starting value for the backoff counter from a contention window.

17. The access point of claim 11, wherein the access point is further configured to receive, from the other access point, an invitation to participate in the sharing of the transmission opportunity, wherein the sharing of the transmission opportunity is coordinated based on the invitation.

18. The access point of claim 11, wherein the access point is further configured to send, to the other access point, a request to participate in the sharing of the transmission opportunity, wherein the sharing of the transmission opportunity is coordinated based on the request.

19. The access point of claim 11, wherein the access point is further configured to receive scheduling information from the other access point, wherein the sharing of the transmission opportunity is coordinated based on the scheduling information.

20. A non-transitory computer readable medium storing a computer program product for controlling an access point in a wireless communication network, the computer program product comprising software instructions that, when run on processing circuitry of the access point, cause the access point to:
    configure a carrier for communication with one or more wireless devices associated with the access point;
    contend for access to the carrier, based on a backoff counter maintained by the access point, to transmit data;
    in response to another access point winning contention for access to the carrier, cooperate at least with the other access point by sharing a transmission opportunity reserved on the carrier by the other access point and transmitting at least a part of the data in the shared transmission opportunity; and
    pause the backoff counter during the shared transmission opportunity.

* * * * *